US008217088B2

(12) United States Patent
Birnbrich et al.

(10) Patent No.: US 8,217,088 B2
(45) Date of Patent: Jul. 10, 2012

(54) USE OF NANOPOROUS POLYMER FOAMS AS THERMAL INSULATION MATERIALS

(75) Inventors: Paul Birnbrich, Solingen (DE); Hans-Josef Thomas, Korschenbroich (DE); Martina Balser, Pulheim (DE)

(73) Assignee: Cognis IP Management GmbH, Duesseldorf (DE)

( * ) Notice: Subject to any disclaimer, the term of this patent is extended or adjusted under 35 U.S.C. 154(b) by 335 days.

(21) Appl. No.: 12/617,348

(22) Filed: Nov. 12, 2009

(65) Prior Publication Data

US 2010/0127204 A1 May 27, 2010

(30) Foreign Application Priority Data

Nov. 15, 2008 (EP) .................................... 08019979

(51) Int. Cl.
*C08J 9/00* (2006.01)
*C08L 63/00* (2006.01)

(52) U.S. Cl. ........................................ 521/65; 521/135

(58) Field of Classification Search ........................ None
See application file for complete search history.

(56) References Cited

U.S. PATENT DOCUMENTS 7,300,963 B2 * 11/2007 Birnbrich et al. ............. 523/403
2005/0113553 A1 * 5/2005 Birnbrich et al. ............. 528/103
2005/0154091 A1 * 7/2005 Lohe et al. .................... 523/420
2005/0158556 A1 * 7/2005 Valette et al. ................. 428/413
2007/0173553 A1 * 7/2007 Taylor, Jr. ....................... 521/99

FOREIGN PATENT DOCUMENTS

GB 2355465 A 4/2001

* cited by examiner

*Primary Examiner* — Robert Sellers
(74) *Attorney, Agent, or Firm* — Diehl Servilla LLC

(57) ABSTRACT

By reaction of one or more epoxy resins with an amphiphilic epoxy resin hardener in water in a phase inversion polymerization, nanoporous polymer foams are obtained. These foams are suitable as thermal insulation materials.

6 Claims, No Drawings

USE OF NANOPOROUS POLYMER FOAMS AS THERMAL INSULATION MATERIALS

CROSS REFERENCE TO RELATED APPLICATION

This application claims priority to European patent application No. 08019979.7, filed 15 Nov. 2008 which is incorporated herein by reference in its entirety.

FIELD OF THE INVENTION

The invention relates to use of certain nanoporous polymer foams as thermal insulation materials.

BACKGROUND OF THE INVENTION

Polymeric epoxy resins have been known for a long time. As a general rule they are prepared by reacting polyepoxides having on average at least two terminal or lateral epoxide groups per molecule with hardeners, more particularly aminic hardeners, which are diamines or polyamines. These polymeric epoxy resins have diverse fields of application, predominantly their use as paints and coating materials (application of a topcoat to a substrate).

EP-A-1,518,875 describes special hardeners for water-based epoxy resin systems, these hardeners being obtainable by reacting a mixture of (a) at least one epoxidized polyalkylene oxide, selected from the group of epoxidized polyethylene oxides, epoxidized polypropylene oxides, and epoxidized polyethylene-propylene oxides, (b) at least one epoxidized aromatic hydroxy compound selected from the group of bisphenol A epoxides and bisphenol F epoxides, and (c) at least one aromatic hydroxy compound selected from the group of bisphenol A and bisphenol F to give an intermediate and subsequently reacting this intermediate with a polyamine. Also disclosed is the use of these hardeners for producing transparent varnishes and coating materials (application of a topcoat to a substrate, for floor coatings, for example).

DETAILED DESCRIPTION OF PREFERRED EMBODIMENTS

It was an object of the present invention to provide nanoporous polymer foams suitable as thermal insulation materials. These materials ought more particularly to have a low thermal conductivity (preferably below 0.09 W/m*K) and high mechanical strength (maximum compressive tension preferably above 1.0 MPa).

The present invention provides for the use of nanoporous polymer foams obtainable by reacting one or more epoxy resins (E) with an amphiphilic epoxy resin hardener (H) in water in a phase inversion polymerization (PIP) as thermal insulation materials.

Nanoporous polymer foams are polymers which have internal cavities. They are sponge-like structures which contain both macropores and micropores, the micropores being dominant and having average cross sections in the range from 10 to 500 nm and more particularly from 10 to 100 nm.

The nanoporous polymer foams for use in accordance with the invention are notable for low thermal conductivity in conjunction with high mechanical strength. This makes the materials particularly attractive for use as mechanically robust, construction-grade thermal insulation materials.

The Epoxy Resins (E)

The epoxide compounds (E) are polyepoxides having on average at least two terminal or lateral epoxide groups per molecule. These epoxide compounds may be either saturated or unsaturated, and may be aliphatic, cycloaliphatic, aromatic or heterocyclic, and may also contain hydroxyl groups. They may, furthermore, include substituents which do not give rise to any disruptive side reactions under the conditions of mixing and of reaction, such as alkyl or aryl substituents, ether moieties, and the like. These epoxide compounds are preferably polyglycidyl ethers based on polyhydric, preferably dihydric, alcohols, phenols, hydrogenation products of these phenols, and/or on novolaks (reaction products of monohydric or polyhydric phenols with aldehydes, especially formaldehyde, in the presence of acidic catalysts). The epoxide equivalent weights of these epoxide compounds are preferably between 85 and 3200, more particularly between 170 and 830. The epoxide equivalent weight of a substance is defined as the amount of the substance (in grams) which contains 1 mol of oxirane rings.

Polyhydric phenols contemplated are preferably the following compounds: resorcinol, hydroquinone, 2,2-bis(4-hydroxyphenyl)propane(bisphenol A), isomer mixtures of dihydroxydiphenylmethane(bisphenol F), tetrabromobisphenol A, 4,4'-dihydroxydiphenylcyclohexane, 4,4'-dihydroxy-3,3-dimethyldiphenylpropane, 4,4'-dihydroxybiphenyl, 4,4'-dihydroxybenzophenol, 1,1-bis(4-hydroxyphenyl)ethane, 1,1-bis(4-hydroxyphenyl)isobutane, bis(4-hydroxyphenyl)methane, bis(4-hydroxyphenyl)ether, bis(4-hydroxyphenyl)sulfone, etc. and also the chlorination and bromination products of the aforementioned compounds; bisphenol A is especially preferred here.

Also suitable as compounds (E) are the polyglycidyl ethers of polyhydric alcohols. Examples of such polyhydric alcohols include ethylene glycol, diethylene glycol, triethylene glycol, 1,2-propylene glycol, polyoxypropylene glycols (n=1-20), 1,3-propylene glycol, 1,4-butylene glycol, 1,5-pentanediol, 1,6-hexanediol, 1,2,6-hexanetriol, glycerol, isosorbide, and 2,2-bis(4-hydroxycyclohexyl)propane.

It is also possible to use polyglycidyl ethers of polycarboxylic acids as compounds (F), obtained by the reaction of epichlorohydrin or similar epoxy compounds with an aliphatic, cycloaliphatic or aromatic polycarboxylic acid, such as oxalic acid, succinic acid, adipic acid, glutaric acid, phthalic acid, terephthalic acid, hexahydrophthalic acid, 2,6-naphthalenedicarboxylic acid, and dimerized linolenic acid. Examples are diglycidyl adipate, diglycidyl phthalate, and diglycidyl hexahydrophthalate.

It is also possible to use mixtures of two or more epoxide compounds (E).

In the production of nanoporous polymer foams, in which, as stated above, the hardeners (H) of the invention are reacted in an aqueous medium with epoxide compounds (E) in a phase inversion polymerization (PIP), it is possible, optionally, for additional processing auxiliaries and/or adjuvants that are well known to the skilled person to be used. Examples of such are pigments, cement, gravel, deaerating agents, defoamers, dispersing assistants, antisettling agents, accelerants, free amines, flow control additives, and conductivity improvers.

The Epoxy Resin Hardeners (H)

Amphiphilic epoxy resin hardeners (H) are those epoxy resin hardeners which have hydrophilic and hydrophobic structural elements.

Preference is given to using those amphiphilic epoxy resin hardeners which are self-emulsifying in water at 25° C. and which, moreover, are capable of emulsifying epoxy resins (E) in water at 25° C.

It is preferred to use those hardeners (H) which are obtainable by reacting a mixture comprising (A) at least one epoxidized polyalkylene oxide, selected from the group of epoxidized polyethylene oxides, epoxidized polypropylene oxides, and epoxidized polyethylene-propylene oxides, (B) at least one epoxidized aromatic hydroxy compound selected from the group of bisphenol A epoxides and bisphenol F epoxides, and (C) at least one aromatic hydroxy compound selected from the group of bisphenol A and bisphenol F to give an intermediate, and then reacting this intermediate with a polyamine (P).

In one embodiment exclusively components (A), (B) and (C) are reacted to give the intermediate, which is further reacted with a polyamine (P).

In another embodiment, the intermediate that is subsequently reacted with the polyamines (P) to give the hardener is prepared using not only compounds (A), (B) and (C) but also compounds (D). The compounds (D) are compounds from the group of the triglycidyl ethers of triols and the diglycidyl ethers of diols. Examples of suitable diols and triols on which the compounds (D) are based include the following: ethylene glycol, diethylene glycol, triethylene glycol, 1,2-propylene glycol, 1,3-proylene glycol, 1,4-butylene glycol, 1,5-pentanediol, 1,6-hexanediol, cyclohexanediol, cyclohexanedimethanol, neopentylglycol, 1,2,6-hexanetriol, glycerol, and trimethylolpropane.

The Compounds (A)

Epoxidized polyethylene oxides in the context of the invention are compounds which are obtainable by converting the two terminal OH groups of polyethylene oxide into oxirane groups, by means, for example, of reaction with epichlorohydrin. The polyethylene oxide used here may have an average molar weight in the range from 80 to 3000; it can be prepared by starting the polymerization of the ethylene oxide on an alkylene diol with C2-C18 in the manner known to the skilled person.

Epoxidized polypropylene oxides in the context of the invention are compounds which are obtainable by converting the two terminal OH groups of polypropylene oxide into oxirane groups, by means, for example, of reaction with epichlorohydrin. The polypropylene oxide used here may have an average molar weight in the range from 110 to 3000; it can be prepared by starting the polymerization of the propylene oxide on an alkylene diol with C2-C18 in the manner known to the skilled person.

Epoxidized polyethylene-propylene oxides in the context of the invention are compounds which are obtainable by converting the two terminal OH groups of polyethylene-propylene oxide into oxirane groups, by reaction, for example, with epichlorohydrin. The polyethylene-propylene oxide used here may have an average molar weight in the range from 80 to 3000. By polyethylene-propylene oxide is meant compounds which are obtainable by copolymerization of ethylene oxide and propylene oxide, in which case the polymerization of the two reactants can be carried out simultaneously or blockwise, the polymerization of the propylene oxide and/or of the ethylene oxide being started on an alkylene diol of C2-C18 in the manner known to the skilled person.

The compounds (A) can be used individually or in a mixture with one another.

The Compounds (B)

Bisphenol A epoxides are understood in the context of the invention, as in the generally customary manner, as being compounds which are obtainable by reacting bisphenol A with epichlorohydrin and/or polymerizing the latter by further reaction with bisphenol A. These compounds are therefore also known under the designation bisphenol A diglycidyl ethers or, generally, as epoxy resins. Commercial products are Epikote 828, 1001, 1002, 1003, 1004, etc. from Shell.

The molecular weights of the bisphenol A epoxides used are preferably in the range from 380 to 3000.

Bisphenol F epoxides are understood in the context of the invention, as in the generally customary manner, as being compounds which are obtainable by reacting bisphenol F with epichlorohydrin and/or polymerizing by further reaction with bisphenol F. These compounds are therefore also known under the designation bisphenol F diglycidyl ethers or, generally, as bisphenol F epoxy resins.

The molecular weights of the bisphenol F epoxides used are preferably in the range from 350 to 3000.

The compounds (B) can be used individually or in a mixture with one another.

The Compounds (C)

Bisphenol A is well known to a skilled person and is characterized by the following formula:

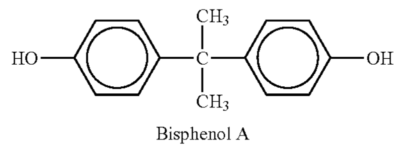

Bisphenol A

Bisphenol F is likewise well known to the skilled person.

The compounds (C) can be used individually or in a mixture with one another.

The Compounds (P)

Polyamines (P) employed in the context of the present invention are primary and/or secondary amines having at least two nitrogen atoms and at least two active amino hydrogen atoms per molecule. Aliphatic, aromatic, aliphatic-aromatic, cycloaliphatic, and heterocyclic diamines and polyamines can be utilized. Examples of suitable polyamines (P) are as follows: polyethylenamines (ethylenediamine, diethylenetriamine, triethylenetetramine, tetraethylenepentamine, etc.), 1,2-propylenediamine, 1,3-propylenediamine, 1,4-butanediamine, 1,5-pentanediamine, 1,3-pentanediamine, 1,6-hexanediamine, 3,3,5-trimethyl-1,6-hexanediamine, 3,5,5-trimethyl-1,6-hexanediamine, 2-methyl-1,5-pentanediamine, bis(3-aminopropyl)amine, N,N'-bis(3-aminopropyl)-1,2-ethanediamine, N-(3-aminopropyl)-1,2-ethanediamine, 1,2-diaminocyclohexane, 1,3-diaminocyclohexane, 1,4-diaminocyclohexane, aminoethylpiperazines, the poly(alkylene oxide) diamines and triamines (such as, for example, Jeffamine D-230, Jeffamine D-400, Jeffamine D-2000, Jeffamine D-4000, Jeffamine T-403, Jeffamine EDR-148, Jeffamine EDR-192, Jeffamine C-346, Jeffamine ED-600, Jeffamine ED-900, Jeffamine ED-2001), meta-xylylenediamine, phenylenediamine, 4,4'-diaminodiphenylmethane, toluenediamine, isophoronediamine, 3,3'-dimethyl-4,4'-diaminodicyclo-exylmethane, 4,4'-diaminodicyclohexylmethane, 2,4'-diaminodicyclohexylmethane, 1,3-bis(aminomethyl)cyclohexane, the mixture of poly(cyclohexyl-aromatic)amines linked via a methylene bridge (also known as MBPCAAs), and polyaminoamides. Polyethylenamines, more particularly diethylenetriamine, are particularly preferred.

The compounds (P) can be used individually or in a mixture with one another.

The Preparation of the Intermediate

In one embodiment the intermediate is prepared using the compounds (A) and (B) in a molar ratio of 0.1:1 to 5:1.

In one embodiment, in the preparation of the intermediate, a molar ratio of the sum of the compounds (A) and (B) (these compounds each contain two oxirane groups per molecule) to compound C (this compound contains two OH groups per molecule) in the range from 1.1:1 to 10:1 is set. This is synonymous with setting the equivalent ratio of oxirane rings in the sum of the compounds (A) and (B) to reactive hydrogen atoms of the compound (C) at a level in the range from 1.1:1 to 10:1.

In a further embodiment, namely in cases where at least one compound (D) is used as well in the course of the preparation of the hardener, in the preparation of the intermediate, a molar ratio of the sum of the compounds (A), (B) and (D) (these compounds each contain two oxirane groups per molecule) to compound C (this compound contains two OH groups per molecule) in the range from 1.1:1.0 to 10.0:1.0 is set. This is synonymous with setting the equivalent ratio of oxirane rings in the sum of the compounds (A), (B) and (D) to reactive hydrogen atoms of the compound (C) at a level in the range from 1.1:1.0 to 10.0:1.0.

On this point, for the sake of clarity, the following elucidation is made: the expression "equivalent ratio" is familiar to the skilled person. The fundamental idea behind the concept of the equivalent is that, for each substance involved in a reaction, consideration is given to the reactive groups involved in the target reaction. The stating of an equivalent ratio then expresses the numerical ratio between the entirety of the reactive groups in the compounds (x) and (y) that are used. In this context it must be borne in mind that a reactive group is understood to be the smallest possible reactive group—the concept of the reactive group, therefore, is not congruent with the concept of the functional group. In the case of H-acidic compounds, for instance, this means that, while OH groups or NH groups constitute such reactive groups, $NH_2$ groups do not, there being two reactive H atoms located on the same nitrogen atom. Here, rationally, within the functional group $NH_2$, the two hydrogen atoms are considered to be a reactive group, and so the functional group $NH_2$ contains two reactive groups, namely the hydrogen atoms.

In one embodiment the intermediate is prepared in the presence of a catalyst, more particularly triphenylphosphine or ethyltriphenylphosphonium iodide. The amount of the catalyst in this case is about 0.01% to 1.0% by weight—based on the total amount of compounds (A), (B) and (C).

The epoxide number (% EpO) of the intermediate is preferably below 10% EpO, more particularly below <5% EpO. The definition of the epoxide number and the details of its analytical determination may be found in the example section of this specification.

The Preparation of the Hardener (H)

For the preparation of the hardener, as already stated, the intermediate is reacted with a polyamine (P).

In one embodiment the intermediate and the polyamine (P) are used in amounts such that the equivalent ratio of the reactive H atoms on the aminonitrogen atoms of (P) to the oxirane groups in the intermediate compound is in the range from 4:1 to 100:1.

The reaction of the intermediate with the polyamine is preferably carried out by initially introducing the polyamine in excess, to ensure that essentially 1 molecule of the polyamine, preferably diethylenetriamine, reacts with each of the epoxide groups of the intermediate compound. Excess amine can be removed by distillation in order to minimize the free amine content.

The Phase Inversion Polymerization (PIP)

Phase inversion polymerization (PIP) means the following: first of all an aqueous emulsion of the epoxy resin (E) in water is prepared, the amphiphilic epoxy resin hardener (H) functioning as emulsifier. This system—also referred to below as reaction system—is initially addressed as an oil-in-water emulsion (O/W emulsion). The oil component of this O/W emulsion is of course the epoxy resin.

In the course of the following reaction of resin and hardener (curing in the sense of a polyaddition) there is a phase inversion, i.e. the reaction system changes from an emulsion of type O/W to an emulsion of type W/O, in which water, as the internal phase, is surrounded by the curing polymer. The reason for this is that, in the course of curing, the original emulsifier properties of the hardener undergo change, since the nature of the hardener is transformed, by polyaddition, in the direction of increasing hydrophobicity.

Following complete curing, then, there is a porous polymer matrix present with the water phase contained in its cavities. The water phase can be removed, if desired, by drying, to give air-filled cavities.

A necessary condition for a phase inversion polymerization to take place is that no water can escape from the reaction system. From a technical standpoint this can be realized in a variety of ways.

First, the reaction system can be introduced into a closed mold. It is also possible to introduce the reaction system into an open system and then to ensure, for example, that (a) sufficient atmospheric humidity prevails at the interface with the gas phase (usually surrounding air), and prevents dryout or water loss from the top layer of the reaction system, or that (b) the interface with the gas phase is covered, by a film, for example.

Whereas the versions of the implementation of the PIP described so far are, so to speak, loss-free embodiments, there is a further version of the PIP implementation in which, although the reaction system is introduced into an open system, no particular measures are taken to prevent water loss of the boundary layer to the gas phase. In this case, water loss in this boundary layer forms a dense, chemical-resistant structure (which can be addressed as a clear coat), which forms a water barrier for the underlying part of the reaction system, with the consequence that the PIP can take place unhindered in said structure. Following complete curing of the reaction system, the dense, chemical-resistant layer (which is generally 0.1 to 0.3 mm thick) can be eliminated by mechanical removal.

The fact that the cured systems are nanoporous structures is evident even on a visual basis, from the fact that the resultant materials are not clear but rather white.

In one preferred embodiment the PIP is carried out such that epoxy resin (E) and hardener (H) are used in an equivalent ratio of 2:1 to 1:2. In this context, (E) to (H) equivalent ratios of 1:1 are particularly preferred.

The PIP is characterized by an introductory phase, in which an O/W emulsion is present, and a curing phase, which begins with formation of the W/O emulsion. The PIP may be carried out at 0% to 100% atmospheric humidity. The water content of the PIP reaction system can be varied in the range from 95 to 20% by weight (based on the overall reaction system).

If desired it is also possible to add thickeners to the reaction system.

The reaction system can be cured in a broad temperature range, preferably between 1° C. and 99° C. and more particularly between 5° C. and 60° C.

In contrast to the customary methods of producing polymer foams, it is also possible to add fillers to the PIP reaction systems. Through the use of selected fillers it is possible to carry out further modification not only to the mechanical properties, such as compressive strength, flexural strength, elasticity modulus, and density, but also to the thermal conductivity of the nanoporous polymer foams of the invention.

EXAMPLES

Abbreviations

In the text below:

EEW=epoxide equivalent weight (as described above)

MW=average molecular weight

RPM=revolutions per minute

%=percent by weight, unless explicitly indicated otherwise

Raw materials used

Epoxy resin (E): Chem Res E20 (Cognis GmbH)

Fillers: hollow glass beads K1 and K25 (3M)

Hollow glass beads K1: 3M Deutschland GmbH (acts as filler)

Hollow glass beads K25: 3M Deutschland GmbH (acts as filler)

Hardeners (H): the following hardeners H1 to H5 were prepared:

Hardener H1

44 g of poly(propylene glycol) diglycidyl ether (EEW: 326 and MW: 652) were mixed at 20 degrees Celsius with 46.2 g of bisphenol A diglycidyl ether (Chem Res E20 from Cognis EEW: 194), 14.0 g of bisphenol A, and 0.1 g of triphenylphosphine. The resulting mixture was heated at 160° C. and stirred at that temperature for about 3.5 hours until the epoxide number was 3.95%. Subsequently it was cooled to 60° C. and at that temperature 121.4 g of diethylenetriamine were added. After the exothermic reaction had subsided, the reaction mixture was heated again at 160° C. for 2 hours.

The excess of diethylenetriamine was removed by distillation under reduced pressure (up to a liquid-phase temperature of 200° C. and to pressures of less than 10 mbar) until free amine no longer distilled over.

The mixture was subsequently cooled to 90° C. and admixed with 89.5 g of water, with thorough stirring.

This gave 205.6 g of a clear amber liquid having a viscosity (without solvent, Brookfield, 10 rpm, 40° C.) of 2140 mPas, a solids content of 60%, and an amine number of 134.

Hardener H2

44 g of poly(propylene glycol) diglycidyl ether (EEW: 326 and MW: 652) were mixed at 20 degrees Celsius with 46.2 g of bisphenol A diglycidyl ether (Chem Res E20 from Cognis EEW: 194), 14.0 g of bisphenol A, and 0.1 g of triphenylphosphine. The resulting mixture was heated at 160° C. and stirred at that temperature for about 9 hours until the epoxide number was 3.81%. Subsequently it was cooled to 60° C. and at that temperature 121.4 g of diethylenetriamine were added. After the exothermic reaction had subsided, the reaction mixture was heated again at 160° C. for 2 hours.

The excess of diethylenetriamine was removed by distillation under reduced pressure (up to a liquid-phase temperature of 200° C. and to pressures of less than 10 mbar) until free amine no longer distilled over.

The mixture was subsequently cooled to 90° C. and admixed with 89.5 g of water, with thorough stirring.

This gave 202.3 g of a clear amber liquid having a viscosity (without solvent, Brookfield, 10 rpm, 40° C.) of 2110 mPas and a solids content of 60%.

Hardener H3

44 g of poly(propylene glycol) diglycidyl ether (EEW: 326 and MW: 652) were mixed at 20 degrees Celsius with 46.2 g of bisphenol A diglycidyl ether (Chem Res E20 from Cognis EEW: 194), 14.0 g of bisphenol A, and 0.1 g of triphenylphosphine. The resulting mixture was heated at 160° C. and stirred at that temperature for about 5 hours until the epoxide number was 4.12%. Subsequently it was cooled to 60° C. and at that temperature 121.4 g of diethylenetriamine were added. After the exothermic reaction had subsided, the reaction mixture was heated again at 160° C. for 2 hours.

The excess of diethylenetriamine was removed by distillation under reduced pressure (up to a liquid-phase temperature of 200° C. and to pressures of less than 10 mbar) until free amine no longer distilled over.

The mixture was subsequently cooled to 90° C. and admixed with 90.5 g of water, with thorough stirring.

This gave 209.2 g of a clear brown-yellow liquid having a viscosity (without solvent, Brookfield, 10 rpm, 40° C.) of 1440 mPas and a solids content of 60%.

Hardener H4

34.4 g of poly(propylene glycol) diglycidyl ether (EEW: 326 and MW: 652) were mixed at 20 degrees Celsius with 46.2 g of bisphenol A diglycidyl ether (Chem Res E20 from Cognis EEW: 194), 14.0 g of bisphenol A, 8.9 g of butanediol diglycidyl ether (EEW: 132) and 0.1 g of triphenylphosphine. The resulting mixture was heated at 160° C. and stirred at that temperature for 2 hours until an epoxide value of 4.39% was obtained. Subsequently it was cooled to 60° C. and at that temperature 121.4 g of diethylenetriamine were added. After the exothermic reaction had subsided, the reaction mixture was heated again at 160° C. for 2 hours.

The excess of diethylenetriamine was removed by distillation under reduced pressure (up to a liquid-phase temperature of 200° C. and to pressures of less than 10 mbar) until free amine no longer distilled over.

The mixture was subsequently cooled to 90° C. and admixed with 91.7 g of water, with thorough stirring.

This gave 211.9 g of a clear pale yellow liquid having a viscosity (without solvent, Brookfield, 10 rpm, 40° C.) of 2500 mPas and a solids content of 60%.

Hardener H5

34.4 g of poly(propylene glycol) diglycidyl ether (EEW: 326 and MW: 652) were mixed at 20 degrees Celsius with 46.2 g of bisphenol A diglycidyl ether (Chem Res E20 from Cognis EEW: 194), 14.0 g of bisphenol A, 10.7 g of hexanediol diglycidyl ether (EEW: 159.1) and 0.1 g of triphenylphosphine. The resulting mixture was heated at 160° C. and stirred at that temperature for 2 hours until an epoxide value of 4.37% was obtained. Subsequently it was cooled to 60° C. and at that temperature 121.4 g of diethylenetriamine were added. After the exothermic reaction had subsided, the reaction mixture was heated again at 160° C. for 2 hours.

The excess of diethylenetriamine was removed by distillation under reduced pressure (up to a liquid-phase temperature of 200° C. and to pressures of less than 10 mbar) until free amine no longer distilled over.

The mixture was subsequently cooled to 90° C. and admixed with 93.0 g of water, with thorough stirring.

This gave 215.1 g of a clear pale yellow liquid having a viscosity (without solvent, Brookfield, 10 rpm, 40° C.) of 2080 mPas and a solids content of 60%.

Use Examples 1 to 7

Epoxy resins (E) and hardeners (H) were introduced into a stirring vessel (diameter 95 mm, height 120 mm) and pre-emulsified using a Pendraulik LM34 stirrer on setting 1 (about 465 revolutions/minute). The amounts of (E) and (H) used can be seen in table 1. A homogeneous white coloration indicated corresponding homogenization. Subsequently the water was added in portions (the amount of water in each case is shown in table 1). The stirring speed was adjusted such that there was just no longer a thrombus formed. The total time from pre-emulsification to processing was approximately 7 minutes. All of the experiments were carried out with an equivalent ratio of epoxy resin to hardener of 1:1.

The hollow glass beads used as a filler in examples 6 and 7 were introduced by careful incorporation using a spatula, so as not to destroy the beads.

Details relating to examples 1 to 7 can be taken from table 1, which also includes the measurement data on thermal conductivity, flexural strengths and compressive strengths, and the nanoporous polymer foams obtained.

Sample Preparation

To produce the test specimens for flexural and compressive strength measurements, corresponding silicone molds were used, coated with the release agent T3 (Ebalta). The sheets for the thermal conductivity measurement were produced in a Teflon mold coated with the release agent Loxiol G40 (Cognis). The casting compounds were covered, but not given an airtight seal, until demolding took place. The test specimens were demolded after 18 h; drying required about 7 days at 23° C. and about 48 h at 55° C.

Thermal Conductivity Measurement

The thermal conductivity was measured in accordance with ISO 8301, corresponding to the thermal flux measurement method. The sheet dimensions were 150 mm×150 mm; the layer thickness varied between 20 mm and 25 mm. Measurement was carried out using a Netzsch HFM 436/3/1 E apparatus; the applied pressure was 65 N. The measurement temperature chosen was 10° C., with a temperature difference of 20 K. This is a standard measurement for thermal insulants. The sheets were dried at room temperature for 7 days and then dried to constant mass at 55° C. Prior to measurement, the samples were stored at room temperature for at least 72 h; special storage under standard conditions did not take place.

Determination of Flexural and Compressive Strengths

The flexural and compressive strengths were measured by methods based on DIN 53452 and 53454 respectively. Storage under standard conditions did not take place. The change in geometry of the specimens could not be predicted exactly, and was therefore disregarded. The measuring instrument used was an Instron 5565 universal testing machine with the Bluehill 2.0 software. The dimensions of the test specimens for the flexural tests were cuboids with 120 mm×10 mm×15 mm, while the compressive tests were carried out using cylindrical test specimens with dimensions of 27 mm height and 12 mm diameter. The testing speeds are given in the DINs. Drying temperatures were 23° C. and 55° C.

TABLE 1

| examples: | | | | | | | |
|---|---|---|---|---|---|---|---|
| | Example | | | | | | |
| | 1 | 2 | 3 | 4 | 5 | 6 | 7 |
| Hardener H1 [g] | 160.0 | 200.0 | 220.0 | 250.0 | 270.0 | 120 | 120 |
| Epoxy resin Chem Res E20 [g] | 145.1 | 181.3 | 199.5 | 226.7 | 244.8 | 108.8 | 108.8 |
| Demineralized water [g] | 297.6 | 288.3 | 243.5 | 208.2 | 163.2 | 223.2 | 223.2 |
| Binder content [%] | 40 | 45 | 50 | 55 | 60 | 40 | 40 |
| Hollow glass beads K1 [g] | none | none | none | none | none | 27.12 | |
| Hollow glass beads K25 [g] | | | | | | | 27.12 |
| Filler content [%] | | | | | | 15 | 15 |
| Drying temperature | 23° C. | 23° C. | 23° C. | 23° C. | 23° C. | 23° C. | 23° C. |
| Density [g/cm$^3$] | 0.47 | 0.51 | 0.57 | 0.64 | 0.58 | 0.32 | 0.39 |
| Thermal conductivity [W/m * K] | 0.05183 | 0.06009 | 0.06716 | 0.07782 | 0.08314 | 0.0460 | 0.0526 |
| Max. compressive tension Mean value [MPa] | 9.0 | 10.4 | 11.0 | 14.7 | 10.6 | 3.9 | 9.7 |
| Max. compressive tension Standard deviation [MPa] | 2.4 | 1.4 | 0.7 | 1.1 | 1.1 | 0.1 | 0.8 |

TABLE 1-continued

| examples: | | | | | | | |
|---|---|---|---|---|---|---|---|
| | Example | | | | | | |
| | 1 | 2 | 3 | 4 | 5 | 6 | 7 |
| Flexural elasticity modulus Mean value [MPa] | 99.4 | 196.4 | 296.2 | 381.9 | 332.8 | 248.6 | 368.2 |
| Flexural elasticity modulus Standard deviation [MPa] | 6.0 | 25.4 | 22.3 | 3.5 | 21.7 | 11.0 | 36.7 |

Notes:
The line "Binder content" serves merely for information. Binder here means simply the reaction product of hardener H1 and epoxy resin (Chem Res E20). The binder content, accordingly, is the percentage fraction of the binder thus defined as a proportion of the overall system. As an example, the calculation of the binder content for example 1 may be demonstrated: since the reaction of epoxy resin with amine hardener (hardener H1) is a polyaddition without elimination of molecular moieties, the mass fractions of resin and hardener are added to give the amount of the resultant binder: the epoxy resin Chem Res E20 used is taken 100% into account (145.1 g). The hardener H1 used has a solids content of 60%, and hence is taken into account only at 0.6 × 160.0 g = 96.0 g. This gives the amount of binder in the system as 96.0 g + 145.1 g = 241.1 g. The overall system additionally contains 297.6 g of water, giving a total amount of 160 g + 145.1 g + 297.6 g = 602.7 g. The binder fraction in the overall system is produced as follows: % binder = 241.1 × 100/602.7 = 40.00%.

What is claimed is:

1. A method of preparing a thermal insulation material comprising a nanoporous polymer foam, said method comprising reacting one or more epoxy resins with an amphiphilic epoxy resin hardener in water in a phase inversion polymerization, wherein said nanoporous polymer foam is useful as a thermal insulation material.

2. The method of claim 1, wherein said epoxy resin hardener comprises a compound obtained by the steps of:

(1) reacting a mixture comprising (A) at least one epoxidized polyalkylene oxide, selected from the group consisting of epoxidized polyethylene oxides, epoxidized polypropylene oxides, and epoxidized polyethylene-propylene oxides, (B) at least one epoxidized aromatic hydroxy compound selected from the group consisting of bisphenol A epoxides and bisphenol F epoxides, and (C) at least one aromatic hydroxy compound selected from the group consisting of bisphenol A and bisphenol F, to give an intermediate, and (2) reacting said intermediate with a polyamine (P).

3. The method of claim 2 wherein said polyamine (P) comprises diethylenetriamine.

4. The method of claim 2 wherein said compound (A) comprises at least one epoxidized polypropylene oxide.

5. The method of claim 2 wherein said compound (8) comprises at least one bisphenol A epoxide.

6. The method of claim 2 wherein said compound (C) comprises bisphenol A.

* * * * *